United States Patent [19]

Pike

[11] 3,922,297

[45] Nov. 25, 1975

[54] PROSTAGLANDIN $E_1$, $F_1$, AND $A_1$ ANALOGS

[75] Inventor: John E. Pike, Kalamazoo, Mich.

[73] Assignee: The Upjohn Company, Kalamazoo, Mich.

[22] Filed: Apr. 8, 1974

[21] Appl. No.: 458,931

Related U.S. Application Data

[60] Division of Ser. No. 324,026, Jan. 16, 1973, Pat. No. 3,847,966, which is a continuation-in-part of Ser. No. 168,455, Aug. 2, 1971, abandoned, which is a division of Ser. No. 748,158, July 29, 1968, abandoned.

[52] U.S. Cl. ... 260/468 D; 260/211 R; 260/247.2 R; 260/268 R; 260/293.65; 260/326.3; 260/410.5; 260/410.9 R; 260/413; 260/429.9; 260/439 R; 260/448 R; 260/501.1; 260/501.15; 260/501.17; 260/501.2; 260/514 D

[51] Int. Cl.² .................. C07C 61/38; C07C 69/74
[58] Field of Search ......... 260/468 D, 514 D, 410.9, 260/413

[56] References Cited

OTHER PUBLICATIONS

Nakano et al., Evr. J. Biochemistry, 11 386 (1969).

*Primary Examiner*—Robert Gerstl
*Attorney, Agent, or Firm*—Earl C. Spaeth

[57] ABSTRACT

This invention is a group of prostaglandin $E_1$, $F_1$, and $A_1$ analogs which differ from the natural compounds in having one or more alkyl or fluoro substituents near the end of the terminal alkyl portion and also near the end of the carboxylic acid chain. These compounds are useful for the same pharmacological purposes as the natural compounds.

9 Claims, No Drawings

PROSTAGLANDIN E₁, F₁, AND A₁ ANALOGS

CROSS REFERENCE TO RELATED APPLICATIONS

This application is a division of copending application Ser. No. 324,026, filed Jan. 16, 1973, now U.S. Pat. No. 3,847,966, which is a continuation-in-part of copending application Ser. No. 168,455, filed Aug. 2, 1971, now abandoned, which is a division of copending application Ser. No. 748,158, filed July 29, 1968, now abandoned.

DESCRIPTION OF THE INVENTION

This invention relates to compositions of matter and to methods for making and using them. In particular, this invention relates to novel analogs of $PGE_1$, $PGF_{1\alpha}$, $PGF_{1\beta}$, $PGA_1$, and their salts and esters.

$PGE_1$ has the following structure:

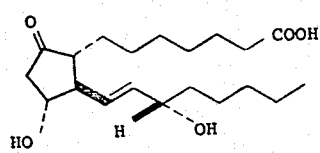

I

Prostaglandin $F_{1\alpha}$ ($PGF_{1\alpha}$) has the following structure:

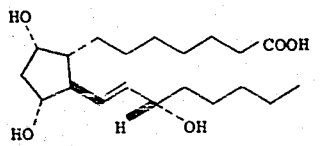

II

Prostaglandin $F_{1\beta}$ ($PGF_{1\beta}$) has the following structure:

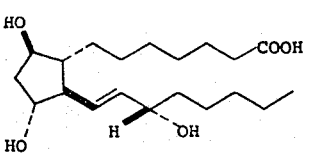

III

Prostaglandin $A_1$ ($PGA_1$) has the following structure:

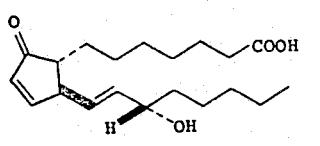

IV $PGE_1$, $PGF_{1\alpha}$, $PGF_{1\beta}$, and $PGA_1$ are derivatives of prostanoic acid which has the following structure and atom numbering:

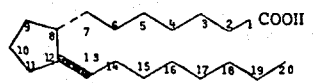

V

Various isomers of $PGE_1$, $PGF_{1\alpha}$, $PGF_{1\beta}$, and $PGA_1$ are known. For example, the compound of the following structure is known as $8\beta$-$PGE_1$ or 8-iso-$PGE_1$:

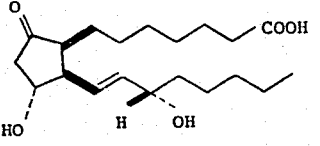

VI

Also, the compound of the following structure is known as $15\beta$-$PGE_1$, although $15R$-$PGE_1$ and 15-epi-$PGE_1$ are alternative names for this compound.

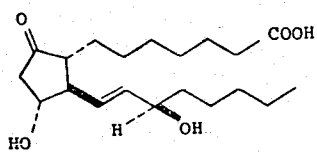

VII

In formulas I–VII as well as in the formulas given hereinafter, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. The configuration of the hydroxy at C-15 in $PGE_1$, $PGF_{1\alpha}$, $PGF_{1\beta}$, and $PGA_1$, is S although alpha is preferred as a designation for that configuration. The configuration of the hydroxy at C-15 in the compound of the formula VII is R although beta is preferred as a designation for that configuration. See Nature 212, 38 (1966) for discussion of the configuration of the prostaglandins.

Each of the novel $PGE_1$, $PGF_{1\alpha}$, $PGF_{1\beta}$, and $PGA_1$ analogs of this invention is encompassed by one of the following formulas:

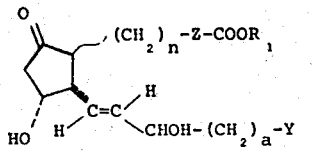

VIII

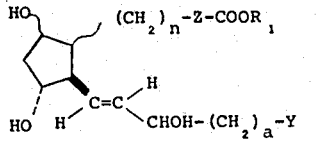

IX

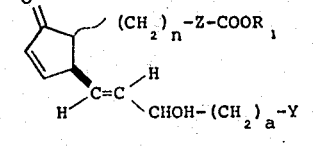

X

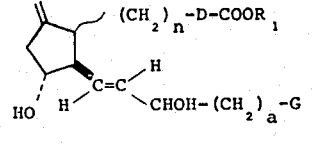

XI

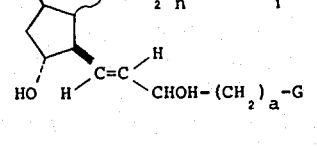

XII

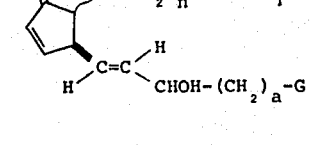

XIII

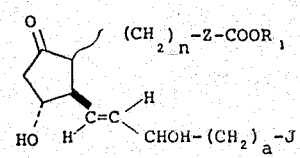

XIV

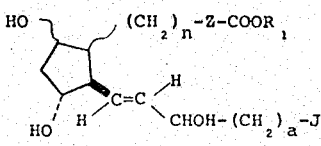

XV

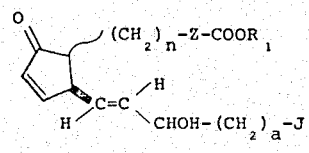

XVI

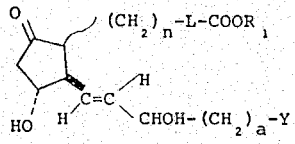

XVII

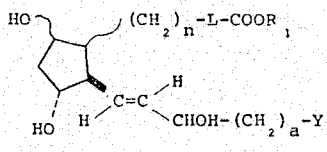

XVIII

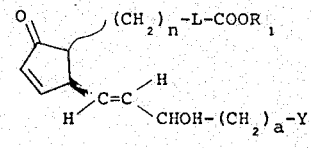

XIX

Compounds of formulas VIII, XI, XIV, and XVII are of the PGE$_1$-type. Compounds of formulas IX, XII, XV and XVIII are of the PGF$_1$-type. Compounds of formulas X, XIII, XVI, and XIX are of the PGA$_1$-type.

In formulas VIII to XIX, R$_1$ is hydrogen, alkyl of one to 8 carbon atoms, inclusive, cycloalkyl of 3 to 10 carbon atoms, inclusive, aralkyl of 7 to 12 carbon atoms, inclusive, phenyl, phenyl substituted with one to 3 chloro or alkyl of one to 4 carbon atoms, inclusive, or ethyl substituted in the β-position with 3 chloro, 2 or 3 bromo, or one, 2, or 3 iodo. Also in formulas VIII to XIX, ~ indicates attachment of the group to the ring in alpha or beta configuration, $a$ is zero to 4, and $n$ is 1 to 6. Y is isobutyl, tert-butyl, 3,3-difluorobutyl, 4,4-difluorobutyl, 4,4,4-trifluorobutyl, 3,3,4,4-tetrafluorobutyl, or 3,3,4,4,4-pentafluorobutyl. Z is ethylene substituted with one or 2 fluoro, i.e., —CH$_2$CHF—, —CHFCH$_2$—, —CH$_2$CF$_2$—, —CF$_2$CH$_2$—, or —CHFCHF—, or ethylene substituted with one or 2 methyl or ethyl, i.e., —CH$_2$CH(CH$_3$)—, —CH(CH$_3$)CH$_2$—, —CH$_2$C(CH$_3$)$_2$—, —C(CH$_3$)$_2$CH$_2$—, —CH(CH$_3$)CH(CH$_3$)—, —CH$_2$CH(C$_2$H$_5$)—, —CH(C$_2$H$_5$)CH$_2$—, —CH$_2$C(C$_2$H$_5$)$_2$—, —C(C$_2$H$_5$)$_2$CH$_2$—, or —CH(C$_2$H$_5$)CH(C$_2$H$_5$)—. D is ethylene substituted by one or 2 fluoro, i.e. —CH$_2$CHF—, —CHFCH$_2$—, —CH$_2$CF$_2$—, —CF$_2$CH$_2$—, or —CHFCHF—. G is 3,3-difluorobutyl, 4,4-trifluorobutyl, 4,4,4-trifluorobutyl, 3,3,4,4-tetrafluorobutyl, or 3,3,4,4,4-pentafluorobutyl. J is isobutyl or tert-butyl. L is ethylene substituted with one or 2 methyl or ethyl, i.e., —CH$_2$CH(CH$_3$)—, —CH(CH$_3$)CH$_2$—, —CH$_2$C(CH$_3$)$_2$—, —C(CH$_3$)$_2$CH$_2$—, —CH(CH$_3$)CH(CH$_3$)—, —CH$_2$CH(C$_2$H$_5$)—, —CH(C$_2$H$_5$)CH$_2$—, —CH$_2$C(C$_2$H$_5$)$_2$—, —C(C$_2$H$_5$)$_2$CH$_2$—, or —CH(C$_2$H$_5$)CH(C$_2$H$_5$)—. Also included among the novel PGE$_1$, PGF$_{1\alpha}$, PGF$_{1\beta}$, and PGA$_1$ analogs of this invention are the pharmacologically acceptable salts of the compounds of formulas VIII to XIX wherein R$_1$ is hydrogen.

The PGE$_1$-type compounds of formulas VIII, XI, XIV, and XVII are useful for pharmacological and medicinal purposes as will be described hereinafter. These same compounds are also useful as intermediates for the preparation of the corresponding compounds of the PGF$_{1\alpha}$-type, the PGF$_{1\beta}$-type, and the PGA$_1$-type.

Formulas VIII to XIX are intended to include compounds wherein the side chain hydroxy has the same configuration as in PGE$_1$, i.e., alpha (S), and compounds wherein the side chain hydroxy has the opposite configuration, i.e., beta (R or epi). In all of these compounds, the carbon-carbon double bond in the side chain is in trans configuration and that side chain is attached to the cyclopentane ring in beta configuration, both as shown in those formulas.

With regard to the novel PGE$_1$-type, PGF$_{1\alpha}$-type, PGF$_{1\beta}$-type, and PGA$_1$-type analogs of formulas VIII to XIX, and R$_1$, examples of alkyl of one to 8 carbon atoms, inclusive, are methyl, ethyl, propyl, butyl, pentyl, hexyl, heptyl, octyl, and isomeric forms thereof, e.g., isopropyl, isobutyl, sec-butyl, tert-butyl, isopentyl, 2-methylpentyl, 5-methylhexyl, 2-ethylhexyl, 4,4-dimethylpentyl, and the like. Examples of cycloalkyl of 3 to 10 carbon atoms, inclusive, which includes alkyl-substituted cycloalkyl, are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3-isopropylcyclohexyl, 2,2-dimethylcyclohexyl, cycloheptyl, cyclooctyl, cyclononyl, and cyclodecyl. Examples of aralkyl of 7 to 12 carbon atoms, inclusive, are benzyl, phenethyl, 1-phenylethyl, 2-phenylpropyl, 4-phenylbutyl, 3-phenylbutyl, 2-(1-naphthylethyl), and 1-(2-naphthylmethyl). Examples of phenyl substituted by one to 3 chloro or alkyl of one to 4 carbon atoms, inclusive, are p-chlorophenyl, m-chlorophenyl, o-chlorophenyl, 2,4-dichlorophenyl, 2,4,6-trichlorophenyl, p-tolyl, m-tolyl, o-tolyl, p-ethylphenyl, p-tert-butylphenyl, 2,5-dimethylphenyl, 4-chloro-2-methylphenyl, and 2,4-dichloro-3-methylphenyl.

PGE$_1$, PGF$_{1\alpha}$, PGF$_{1\beta}$, and PGA$_1$, and their esters and pharmacologically acceptable salts, are extremely potent in causing various biological responses. For that reason, these compounds are useful for pharmacological purposes. See, for example, Bergstrom et al., Pharmacol. Rev. 20, 1 (1968), and references cited therein. A few of those biological responses are systemic arterial blood pressure lowering in the case of PGE$_1$, PGF$_{1\beta}$, and PGA$_1$ as measured, for example, in anesthetized (pentobarbital sodium) pentolinium-treated rats with indwelling aortic and right heart cannulas; pressor activity, similarly measured, for PGF$_{1\alpha}$; stimulation of smooth muscle as shown, for example, by tests on strips of guinea pig ileum, rabbit duodenum, or gerbil colon; potentiation of other smooth muscle stimulants; antilipolytic activity as shown by antagonism of epinephrine-induced mobilization of free fatty acids or inhibition of the spontaneous release of glycerol from isolated rat fat pads, inhibition of gastric secretion in the case of $PGE_1$ and $PGA_1$ as shown in dogs with secretion stimulated by food or histamine infusion; activity on the central nervous system; decrease of blood platelet adhesiveness as shown by platelet-to-glass adhesiveness, and inhibition induced by various physical stimuli, e.g., arterial injury, and various biochemical stimuli, e.g., ADP, ATP, serotonin, thrombin, and collagen.

Because of these biological responses, these known prostaglandins are useful to study, prevent, control, or alleviate a wide variety of diseases and undesirable physiological conditions in birds and mammals, including humans, useful domestic animals, pets, and zoological specimens, and in laboratory animals, for example, mice, rats, rabbits, and monkeys.

For example, these compounds, and especially $PGE_1$, are useful in mammals, including man, as nasal decongestants. For this purpose, the compounds are used in a dosage range of about 10 µg. to about 10 mg. per ml. of a pharmacologically suitable liquid vehicle or as an aerosol spray, both for topical application.

$PGE_1$ and $PGA_1$ are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 µg. to about 500 µg. per kg. of body weight per minute, or in a total daily dose by injection or infusion in the range about 0.1 to about 20 mg. per kg. of body weight per day, the exact dose depending on the age, weight, and condition of the patient or animal, and on the frequency and route of administration.

$PGE_1$, $PGA_1$, $PGF_{1\alpha}$, and $PGF_{1\beta}$ are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent post-operative thrombosis, to promote patency of vascular grafts following surgery, and to treat conditions such as atherosclerosis, arteriosclerosis, blood clotting defects due to lipemia, and other clinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response, especially in emergency situations, the intravenous route of administration is preferred. Doses in the range about 0.004 to about 20 mg. per kg. of body weight per day are used, the exact dose depending on the age, weight, and condition of the patient or animal, and on the frequency and route of administration.

$PGE_1$, $PGA_1$, $PGF_{1\alpha}$, and $PGF_{1\beta}$ are especially useful as additives to blood, blood products, blood substitutes, and other fluids which are used in artifical extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about 0.001 to 10 mg. per liter of circulating fluid. It is especially useful to use these compounds in laboratory animals, e.g., cats, dogs, rabbits, monkeys, and rats, for these purposes in order to develop new methods and techniques for organ and limb transplants.

$PGE_1$ is extremely potent in causing stimulation of smooth muscle, and is also highly active in potentiating other known smooth muscle stimulators, for example, oxytocic agents, e.g., oxytocin, and the various ergot alkaloids including derivatives and analogs thereof. Therefore $PGE_1$ is useful in place of or in combination with less than usual amounts of these known smooth muscle stimulators, for example, to relieve the symptoms of paralytic ileus, or to control or prevent atonic uterine bleeding after abortion or delivery, to aid in expulsion of the placenta, and during the puerperium. For the latter purpose, $PGE_1$ is administered by intravenous infusion immediately after abortion or delivery at a dose in the range about 0.01 to about 50 µg. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

$PGE_1$, $PGA_1$, and $PGF_{1\beta}$ are useful as hypotensive agents to reduce blood pressure in mammals, including man. For this purpose, the compounds are administered by intravenous infusion at the rate about 0.01 to about 50 µg. per kg. of body weight per minute or in single or multiple doses of about 25 to 500 µg. per kg. of body weight total per day.

As mentioned above, $PGE_1$ is a potent antagonist of epinephrine-induced mobilization of free fatty acids. For this reason, this compound is useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes mellitus, vascular diseases, and hyperthyroidism.

The $PGE_1$, $PGF_{1\alpha}$, and $PGA_1$ compounds are useful in the treatment of asthma. For example, these compounds are useful as bronchodilators or as inhibitors of mediators, such as SRS-A, and histamine which are released from cells activated by an antigen-antibody complex. Thus, these compounds control spasm and facilitate breathing in conditions such as bronchial asthma, bronchitis, bronchiectasis, pneumonia and emphysema. For these purposes, these compounds are administered in a variety of dosage forms, e.g., orally in the form of tablets, capsules, or liquids: rectally in the form of suppositories, parenterally, subcutaneously, or intramuscularly, with intravenous administration being preferred in emergency situations; by inhalation in the form of aerosols or solutions for nebulizers; or by insufflation in the form of powder. Doses in the range of about 0.01 to 5 mg. per kg. of body weight are used 1 to 4 times a day, the exact dose depending on the age, weight, and condition of the patient and on the frequency and route of administration. For the above use these prostaglandins can be combined advantageously with other anti-asthmatic agents, such as sympathomimetics (isoproterenol, phenylephrine, ephedrine, etc.); xanthine derivatives (theophylline and aminophyllin); and corticosteroids (ACTH and precinisolone). Regarding use of these compounds, see South African Pat. No. 681,055.

The $PGE_1$, $PGA_1$, and $PGF_{1\beta}$ compounds also increase the flow of blood in the mammalian kidney, thereby increasing volume and electrolyte content of the urine. Therefore, these compounds are useful in managing cases of renal disfunction, especially those involving blockage of the renal vascular bed. Illustratively, the compounds are useful to alleviate and correct cases of edema resulting, for example, from massive surface burns, and in the management of shock. For these purposes, the compounds are preferably first administered by intravenous injection at a dose in the range 10 to 1000 $\mu$g. per kg. of body weight or by intravenous infusion at a dose in the range 0.1 to 20 $\mu$g. per kg. of body weight per minute until the desired effect is obtained. Subsequent doses are given by intravenous, intramuscular, or subcutaneous injection or infusion in the range 0.05 to 2 mg. per kg. of body weight per day.

The $PGF_{1\alpha}$, $PGF_{1\beta}$, $PGE_1$, and $PGA_1$ compounds are useful for controlling the reproductive cycle in ovulating female mammals, including humans and animals such as monkeys, rats, rabbits, dogs, cattle, and the like. For that purpose, $PGF_{1\alpha}$, for example, is administered systemically at a dose level in the range 0.01 mg. to about 20 mg. per kg. of body weight of the female mammal, advantageously during a span of time starting approximately at the time of ovulation and ending approximately at the time of menses or just prior to menses. Additionally, expulsion of an embryo or a fetus is accomplished by similar administration of the compound during the first third of the normal mammaliam gestation period.

The novel compounds of this invention encompassed by formulas VIII to XIX each cause the same biological responses described above for the known prostaglandins. Each of these compounds is accordingly useful for the above-described pharmacological uses, and is used for those purposes as described above. However, it is preferred not to use the compounds of formulas VIII to XIX wherein $R_1$ is ethyl substituted in the $\beta$-position with chloro, bromo, or iodo for these pharmacological purposes. Those compounds are more useful for other purposes as will be described hereinafter.

The natural prostaglandins, $PGE_1$, $PGF_{1\alpha}$, and $PGA_1$, and the $PGE_1$ reduction product $PGF_{1\beta}$, are all potent in causing multiple biological responses even at low doses. For example, $PGE_1$ is extremely potent in causing vasodepression and smooth muscle stimulation, and also is potent as an antipolytic agent. In striking contrast, the novel formula VIII to XIX compounds are substantially more specific with regard to potency in causing prostaglandin-like biological responses. Therefore, each of the formula VIII to XIX compounds is surprisingly and unexpectedly more useful than one of the corresponding known prostaglandins for at least one of the pharmacological purposes indicated for the latter, and is surprisingly and unexpectedly more useful for that purpose because it has a different and narrower spectrum of activity than the natural prostaglandin, and therefore is more specific in its activity and causes smaller and fewer undesired side effects than when the natural prostaglandin is used for the same purpose. Moreover, some of these novel prostaglandin analogs have greater potency in causing one or more of the above-described biological responses than the corresponding natural compound.

Further, these novel formula VIII to XIX prostaglandin analogs are especially useful because they have a substantially longer duration of activity than the corresponding known compounds, and because they can be administered orally, sublingually, intravaginally, or rectally, as well as by the usual intravenous, intramuscular, or subcutaneous injection or infusion as indicated above for the uses of the known prostaglandins. These qualities are advantageous because they facilitate maintaining uniform levels of these compounds in the body with fewer, shorter, or smaller doses, and make possible self-administration by the patient.

Especially preferred compounds for the above-described pharmacological purposes are those within the scope of formulas VIII to XIX wherein n is 4, i.e., wherein $-(CH_2)_n-$ represents tetramethylene. With regard to formulas XIV, XV, and XVI, another preference is that a be 2 or 3. With regard to formulas XI, XII, and XIII, another preference is that a be one or 2. Two other preferences regarding formulas VIII to XIX are that that the respective $-(CH_2)_n-Z-COOR_1$, $-(CH_2)_n-D-COOR_1$, and $-(CH_2)_n-L-COOR_1$ side chains be attached to the ring in alpha configuration and that the side-chain hydroxy have the same configuration as in $PGE_1$ (formula I), i.e., the alpha configuration.

The novel prostaglandin analogs of formulas VIII to XIX, including the preferred compounds defined above, are used for the above-described pharmacological purposes in the free acid form, i.e., when $R_1$ is hydrogen, in the ester form, or in pharmacologically acceptable salt form. When the ester form is used, the ester can be any of those within the above definition of $R_1$, except that as mentioned above, use of the compounds wherein $R_1$ is ethyl substituted in the $\beta$-position with chloro, bromo, or iodo for these purposes is not preferred. Among the various esters, alkyl of one to four carbon atoms, inclusive, are preferred. Of those alkyl, methyl and ethyl are especially preferred for optimum absorption of the compound by the body or experimental animal system.

Pharmacologically acceptable salts of these formula VIII to XIX compounds are those with cations which are quaternary ammonium ions, or the cationic form of a metal, ammonia, or an amine.

Especially preferred metal cations are those derived from the alkali metals, e.g., lithium, sodium, and potassium, and from the alkaline earth metals, e.g., magnesium and calcium, although cationic forms of other metals, e.g., aluminum, zinc, and iron, are within the scope of this invention.

Pharmacologically acceptable amine cations within the scope $R_1$ are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamfne, allylamine, crotylamine, cyclopentylamine, dicyclohexylamine, benzylamine, dibenzylamine, $\alpha$-phenylethylamine, $\beta$-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris(hydroxymethyl)aminoethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations within the scope of $R_1$ are tetramethylammonium, tetraethylammonium, benzyltrimethylammonium, phenyltriethylammonium, phenyltrimethylammonium, and the like.

As discussed above, the compounds of formulas VIII to XIX are administered in various ways for various purposes; e.g., intravenously, intramuscularly, subcutaneously, orally, intravaginally, rectally, sublingually, topically, and in the form of sterile implants for prolonged action.

For intravenous injection or infusion, sterile aqueous isotonic solutions are preferred. For that purpose, it is preferred because of increased water solubility that $R_1$ be hydrogen or a pharmacologically acceptable cation. For subcutaneous or intramuscular injection, sterile solutions or suspensions of the acid, salt, or ester form in aqueous or non-aqueous media are used. Tablets, capsules, and liquid preparations such as syrups, elixers, and simple solutions, with the usual pharmaceutical carriers are used for oral or sublingual administration. For rectal or vaginal administration, suppositories prepared as known in the art are used. For tissue implants, a sterile tablet or silicone rubber capsule or other object containing or impregnated with the substance is used.

As mentioned above, the $PGE_1$-type compounds of formulas VIII, XI, XIV and XVII are used as intermediates to prepare the corresponding $PGF_{1\alpha}$ -type and $PGF_{1\beta}$ -type compounds of formulas IX, XII, XV, and XVIII, and $PGA_1$-type compounds of formulas X, XIII, XVI, and XIX.

The $PGF_{1\alpha}$ -type and $PGF_{1\beta}$ -type compounds are prepared by carbonyl reduction of the corresponding $PGE_1$-type compounds. For example, carbonyl reduct on of a formula VIII $PGE_1$-type compound gives a mixture of the corresponding formula IX $PGF_{1\alpha}$ -type and $PGF_{1\beta}$ -type compounds. Similarly, carbonyl reduction of a formula XI $PGE_1$-type compound gives a mixture of the corresponding formula XII $PGF_{1\alpha}$ -type and $PGF_{1\beta}$ -type compounds, carbonyl reduction of a formula XIV $PGE_1$-type compound gives a mixture of the corresponding formula XV $PGF_{1\alpha}$ -type and $PGF_{1\beta}$ -type compounds, and carbonyl reduction of a formula XVII $PGE_1$-type compound gives a mixture of the corresponding formula XVIII $PGF_{1\alpha}$ -type and $PGF_{1\beta}$ -type compounds.

These ring carbonyl reductions are carried out by methods known in the art for ring carbonyl reductions of known prostanoic acid derivatives. See, for example, Bergstrom et al., Arkiv Kemi 19, 563 (1963), Acta Chem. Scand. 16, 969 (1962), and British Patent specification No. 1,097,533. Any reducing agent is used which does not react with carbon-carbon double bonds or ester groups. Preferred reagents are lithium(tri-tert-butoxy) aluminum hydride, the metal borohydrides, especially sodium, potassium and zinc borohydrides, the metal trialkoxy borohydrides, e.g., sodium trimethoxyborohydride. The mixtures of alpha and beta hydroxy reduction products are separated into the individual alpha and beta isomers by methods known in the art for the separation of analogous pairs of known isomeric prostanoic acid derivatives. See, for example, Bergstrom et al., cited above, Granstrom et al., J. Biol. Chem. 240, 457 (1965), and Green et al., J. Lipid Research 5, 117 (1964). Especially preferred as separation methods are partition chromatographic procedures, both normal and reversed phase, preparative thin layer chromatography, and countercurrent distribution procedures.

The $PGA_1$-type compounds are prepared by acidic dehydration of the corresponding $PGE_1$-type compounds. For example, acidic dehydration of a formula VIII $PGE_1$-type compound gives the corresponding formula X $PGA_1$-type compound. Similarly, acidic dehydration of a formula XI $PGE_1$-type compound gives the corresponding formula XIII $PGA_1$-type compound, acidic dehydration of a formula XIV $PGE_1$-type compound gives the corresponding formula XVI $PGA_1$-type compound and acidic dehydration of a formula XVII $PGE_1$-type compound gives the corresponding XIX $PGA_1$-type compound.

These acidic dehydrations are carried out by methods known in the art for acidic dehydrations of known prostanoic acid derivatives. See, for example, Pike et al., Proc. Nobel Symposium II, Stockholm (1966), Interscience Publishers, New York, pp. 162–163 (1967); and British patent specification No. 1,097,533. Alkanoic acids of 2 to 6 carbon atoms, inclusive, especially acetic acid, are preferred acids for this acidic dehydration. Dilute aqueous solutions of mineral acids, e.g., hydrochloric acid, especially in the presence of a solubilizing diluent, e.g., tetrahydrofuran are also useful as reagents for this acidic dehydration, although these reagents may cause partial hydrolysis of an ester reactant.

These carbonyl reductions and acidic dehydrations are shown in Chart A for formula VIII $PGE_1$-type reactants and formula IX $PGF_{1\alpha}$ -type and $PGF_{1\beta}$ -type and formula reactants $PGA_1$-type products. Similar processes are used for transformation of formula XI, XIV and XVII $PGE_1$-type reeactants to be corresponding $PGF_{1\alpha}$ -type, $PGF_{1\beta}$ -type, and $PGA_1$-type products. In Chart A, $R_1$, Y, Z, $n$, $a$, and ~ are as defined above.

CHART A

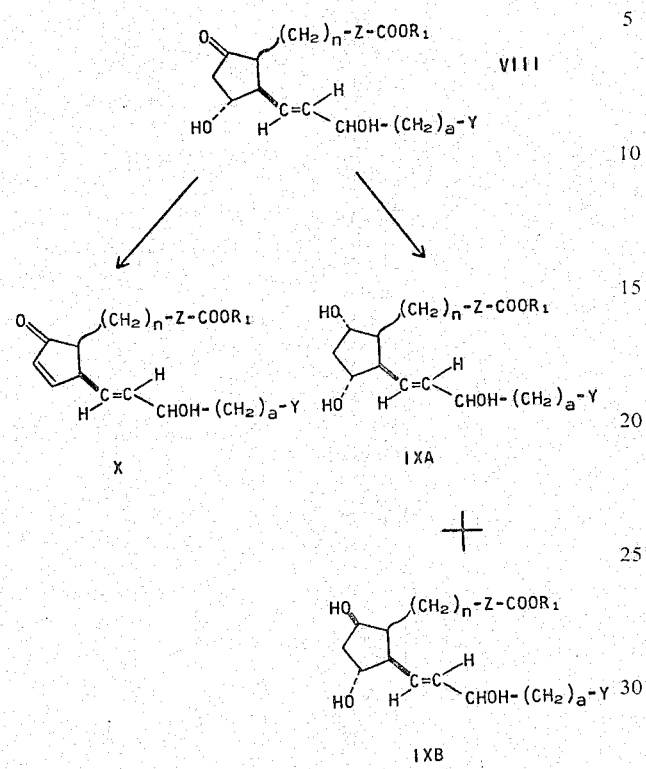

The PGE$_1$-type esters encompassed by formula VIII are prepared by the sequence of reactions shown in Chart B. Similar reaction sequences are used to prepare the PGE$_1$-type esters of formulas XI, XIV and XVII. In Chart B, $a$, $n$, Y and Z are as defined above, and R$_2$ has the same definition as R$_1$ except that hydrogen is not included in the definition of R$_2$, R$_3$ is alkyl of one to 5 carbon atoms, inclusive, and ~ indicates alpha or beta attachment of —(CH$_2$)$_n$—Z—COOR$_2$ to the cyclopentane ring and exo or endo configuration with respect to the group attached to the cyclopropane ring. The PGE$_1$-type acids of formula VIII (R$_1$ is hydrogen) are not prepared by this Chart B sequence, but rather from certain of the formula VIIIA esters by methods described below.

CHART B

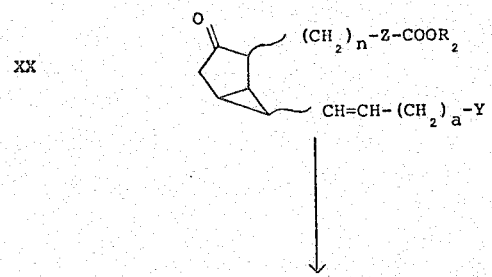

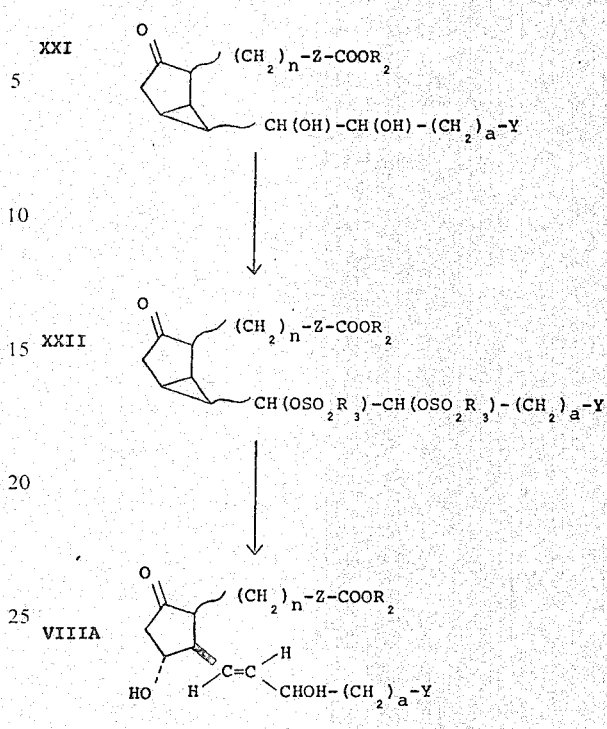

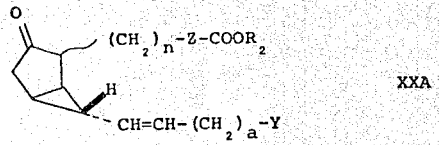

Exo-bicyclo[3.1.0]hexane olefins of formula XX have the formula:

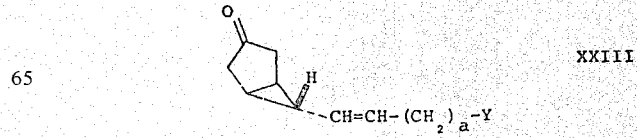

These olefins are known in the art or are prepared by methods known in the art. See, for example, Belgian Pat. No. 702,477; reprinted in Farmdoc Complete Specifications, Book 714, No. 30,905, page 313, Mar. 12, 1968. See also Just et al., J. Am. Chem. Soc. 91, 5364 (1969).

In that Belgian patent, the reaction sequence leading to exo olefin XXA is as follows: The hydroxy of 3-cyclopentenol is protected, for example, with a tetrahydropyranyl group. Then a diazoacetic acid ester is added to the double bond to give an exo-endo mixture of a bicyclo[3.1.0]hexane substituted at 3 with the protected hydroxy and at 6 with an esterified carboxyl. The exo-endo mixture is treated with a base to isomerize the endo isomer in the mixture to more of the exo isomer. Next, the carboxylate ester group at 6 is transformed to an aldehyde group. Then, said aldehyde group is transformed by the Wittig reaction to a moiety of the formula —CH=CH—(CH$_2$)$_a$—Y. This moiety is in exo configuration relative to the bicyclo ring structure. Next, the protective group is removed to regenerate the 3-hydroxy which is then oxidized, for example, by the Jones reagent, to give an intermediate of the formula:

Finally, this formula XXIII intermediate is alkylated with an ω-iodo or ω-bromo ester of the formula I—(CH₂)ₙ—Z—COOR₂ or Br—(CH₂)ₙ—Z—COOR₂ to give a mixture of the alpha and beta isomers of the formula XXA olefin. These alpha and beta isomers are separated by chromatography as described in said Belgian patent.

Endo-bicyclo[3.1.0]hexane olefins of formula XX have the formula

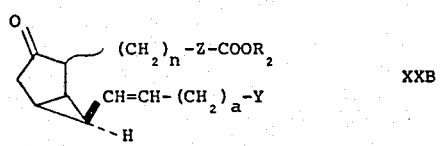

XXB

These are prepared by reacting endo-bicyclo[3.1.0-]hex-2-ene-6-carboxylic acid methyl ester with diborane in a mixture of tetrahydrofuran and diethyl ether to give a mixture of the methyl esters of endo-bicyclo[3.1.0]hexan-3-ol-6-carboxylic acid and endo-bicyclo[3.1.0]hexan-2-ol-6-carboxylic acid. This mixture is reacted with dihydropyran to give the corresponding mixture of tetrahydropyranyl ethers. The carboxylate group at 6 in this mixture of ethers is then transformed to an aldehyde group which in turn is transformed by the Wittig reaction to a moiety of the formula —CH=λCH—(CH₂)ₐ—Y. This moiety is in endo configuration relative to the bicyclo ring structure. Next, the tetrahydropyranyl group is removed, and the resulting hydroxy group is oxidized, for example, by the Jones reagent, to give an intermediate of the formula:

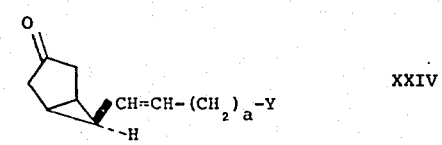

XXIV

Mixed with this formula XXIV intermediate is some of the corresponding 2-keto isomer. These are separated by silica gel chromatography, and the formula XXIV compound is alkylated with a compound of the formula I—(CH₂)ₙ—Z—COOR₂ or Br—(CH₂)ₙ—Z—COOR₂. The resulting alpha and beta isomers of formula XXB are then separated as described above for the formula XXA exo olefins.

Four stereoisomers are possible for each of the exo and endo olefins encompassed by formulas XXA and XXB. The —CH=CH— moiety can exist in cis or trans form, and the —(CH₂)ₙ—Z—COOR₂ chain can be attached to the cyclopentane ring in alpha or beta configuration.

The Wittig reaction leading to the intermediates of formulas XXIII and XXIV produces mixtures of cis and trans isomers, with the cis isomer usually predominate. These isomers can be separated, for example, by silica gel chromatography, and alkylated separately to give cis and trans forms of the formula XXA and XXB olefins. However, these cis and trans olefins are equally useful as intermediates in the processes of Chart B, and there is usually no need to carry out this separation.

The alkylation reactions leading from exo intermediate XXIII to exo olefin XXA and from endo intermediate XXIV to endo olefin XXB produce mixtures of alpha and beta isomers. The processes of Chart B usually do not change this alpha or beta configuration of the —(CH₂)ₙ—Z—COOR₂ moiety, and when the pure alpha or pure beta isomers of the formula VIIIA PGE₁-type product is desired, it is necessary to separate alpha and beta isomers at some stage, i.e., olefin XX, glycol XXI, bis-sulfonate XXII, or product VIIIA. Separation of alpha and beta isomers of olefin XX is preferred. This separation is carried out by silica gel chromatography as described in said Belgian patent and exemplified below.

With regard to the Wittig reagents necessary to prepare the intermediates of formulas XXIII and XXIV, these are triphenylphosphonium bromides prepared as known in the art from the corresponding alkyl or fluoroalkyl bromides, all of which are known in the art or can be prepared by methods known in the art. To illustrate, the necessary alkyl bromides have the formulas (CH₃)₂CHCH₂(CH₂)ₐCH₂Br and (CH₃)₃C(CH₂)ₐCH₂Br, wherein a is zero to 4. For the compounds wherein a is zero, the alcohols (CH₃)₂CHCH₂CH₂OH and (CH₃)₃CCH₂OH are known, and the corresponding bromides are prepared by reacting said alcohols with phosphorus tribromide. The bromides wherein a is one to 4 are prepared by extending the chains of the above two bromides by reacting them with sodium cyanide, hydrolyzing the resulting nitriles to the corresponding carboxylic acids, reducing those acids to primary alcohols, and reacting the alcohols with phosphorus tribromide. This reaction sequence is repeated as often as necessary to prepare all of the required alkyl bromides.

The necessary fluoroalkyl bromides have the formulas CH₃CF₂CH₂CH₂(CH₂)ₐCH₂Br, CHF₂CH₂CH₂CH₂(CH₂)ₐCH₂Br, CF₃CH₂CH₂CH₂(CH₂)ₐCH₂Br, CHF₂CF₂CH₂CH₂(CH₂)ₐCH₂Br, and CF₃CF₂CH₂CH₂(CH₂)ₐCH₂Br, wherein a is zero to 4. The bromides of the first group are prepared from ketocarboxylic acids CH₃COCH₂CH₂(CH₂)ₐCOOH, all of which are known. The methyl esters of those acids are prepared and reacted with sulfur tetrafluoride to give CH₃CF₂CH₂CH₂(CH₂)ₐCOOCH₃, which are reduced with lithium aluminum hydride to give primary alcohols, which in turn are reacted with phosphorus tribromide to give the desired bromides. The second group of fluoroalkyl bromides are prepared from the known carboxylic acids HOOCCH₂CH₂CH₂(CH₂)ₐCOOH. These are esterified to dimethyl esters and then half saponified with barium hydroxide. The free carboxyl group is changed by known methods to a carboxaldehyde group, and the resulting aldehyde is reacted with sulfur tetrafluoride to give CHF₂CH₂CH₂CH₂(CH₂)ₐCOOCH₃. Successive treatment of that with lithium aluminum hydride and phosphorus tribromide gives the desired fluoroalkyl bromide. The third group of fluoroalkyl bromides is prepared from aldehydes OCHCH₂CH₂CH₂(CH₂)ₐCOOCH₃, prepared as above. Successive reaction of those with sodium borohydride and phosphorus tribromide gives BrCH₂CH₂CH₂CH₂(CH₂)ₐCOOCH₃. Saponification of that ester and reaction of the acid with sulfur tetrafluoride gives the desired third group of fluoroalkyl bromides. The fourth and fifth groups of fluoroalkyl bromides are prepared starting with the known alcohols $CHF_2CF_2CH_2OH$ and $CF_3CF_2CH_2OH$. Those are transformed to bromides by reaction with phosphorus tribromide. Then the carbon chain of those bromides is extended one methylene at a time until the desired fluoroalkyl bromide is obtained. This chain extension is accomplished as above by replacement of bromine with —CN, hydrolysis of —CN to —COOH, reduction of —COOH to —$CH_2OH$, and transformation of —$CH_2OH$ to —$CH_2Br$.

The necessary alkylating agents for the above-described alkylations of the exo and endo intermediates XXIII and XXIV to form the corresponding compounds of Formulas XXA and XXB are represented by the formulas Hal—$(CH_2)_n$—Z—$COOR_2$, Hal—$(CH_2)_n$—D—$COOR_2$ and Hal—$(CH_2)_n$—L—$COOR_2$ wherein $n$, $R_2$, D, L and Z are as defined above and Hal is iodo or bromo. These esters of substituted ω-iodo or ω-bromo alkanoic acids are known in the art or are prepared by methods known in the art. For example, they are prepared starting with the appropriate succinic acid, HOOC—Z—COOH, HOOC—D—COOH, or HOOC—L—COOH, wherein Z, D and L are as defined above, all of which are known in the art. These succinic acids are transformed to anhydrides by methods known in the art. The anhydride is then reacted with an alcohol or a phenol of the formula $R_2OH$, wherein $R_2$ is as defined above, by methods known in the art, to give a mixture of isomeric half esters, HOOC—Z—$COOR_2$ plus $R_2OOC$—Z—COOH or HOOC—D—$COOR_2$ plus $R_2OOC$—D—COOH or HOOC—L—$COOR_2$ plus $R_2OOC$—L—COOH. These isomers are separated. Then, the free carboxyl is transformed to —COCl with thionyl chloride, the —COCl is transformed to —CHO by the Rosenmund reduction, the —CHO is transformed to —$CH_2OH$ by reduction with sodium borohydride, and the —$CH_2OH$ is transformed to —$CH_2Br$ by reaction with phosphorus tribromide, thereby producing $BrCH_2$—Z—$COOR_2$, $R_2OOC$—Z—$CH_2Br$, $BrCH_2$—D—$COOR_2$, $R_2OOC$—D—$CH_2Br$, $BrCH_2$—L—$COOR_2$ and $R_2OOC$—L—$CH_2Br$. Then, additional —$CH_2$— moieties are added as often as desired by replacing —Br with —CN using sodium cyanide, hydrolyzing —CN to —COOH, and transforming —COOH to —$CH_2Br$ as described above. Finally, —Br is replaced with —I if desired by reaction of the bromo-ester with sodium iodide in acetone.

Referring again to Chart B, the glycol intermediates of formula XXI are prepared by hydroxylation of olefins XX. Hydroxylation reagents and procedures for this purpose are known in the art. See, for example, Gunstone, Advances in Organic Chemistry, Vol. I, pp. 103–147 (1960), Interscience Publishers, New York, N.Y. Especially useful hydroxylation reagents for this purpose are osmium tetroxide and performic acid (formic acid plus hydrogen peroxide). Various mixtures of glycols isomeric with respect to the —CH(OH)—CH(OH)— moiety are obtained by these olefin hydroxylations depending on the nature of the hydroxylation reagent and the cis and trans content of the formula XX olefin. These glycol isomers can be separated by silica gel chromatography. However, these separations are usually not necessary since all isomers of a particular glycol are equally useful as intermediates to produce the desired formula VIIIA product.

Referring again to Chart B, the glycol intermediates of formula XXI are transformed to bis-alkanesulfonates of formula XXII by reaction of the glycol with an alkane-sulfonyl chloride or bromide, the alkane portion of which contains one to 5 carbon atoms, inclusive. The reaction is carried out in the presence of a base to neutralize the by-product acid. Especially suitable bases are tertiary amines, e.g., dimethylaniline or pyridine. It is usually sufficient merely to mix the two reactants and the base, and maintain the mixture in the range 0° to 25°C. for several hours. The formula XXII bis-sulfonic acid esters are then isolated by procedures known to the art and exemplified below. It is usually not necessary to purify the bis-sulfonic acid esters prior to transformations to the desired $PGE_1$-type esters.

Referring again to Chart B, the bis-sulfonic acid esters of formula XXII are transformed to the desired $PGE_1$-type esters of formula VIIIA by reacting the bis-sulfonic acid ester with water. This reaction is carried out by mixing the bis-sulfonic acid ester with water in the range about 0° to about 60°C. In making dl-2,2-dimethyl-19-methyl-$PGE_1$ methyl ester, 25°C. is a suitable reaction temperature, the reaction then proceeding to completion in about 20 hours. It is advantageous to have a homogenous reaction mixture. This is accomplished by adding sufficient of a water-soluble organic diluent which does not enter into the reaction. Acetone is a suitable diluent. The desired product is isolated by evaporation of excess water and diluent if one is used. The residue contains a mixture of formula VIIIA isomers which differ in the configuration of the side chain hydroxy, being either α (S) or β (R). These are separated from by-products and from each other by silica gel chromatography.

For this transformation of a formula XXII bis-sulfonate to a formula VIIIA $PGE_1$-type product, it is preferred to use the bis-mesyl esters, i.e., compounds of formula XXII wherein both $R_3$ are methyl.

As mentioned above, the processes of Chart B lead to esters of $PGE_1$-type compounds. For some of the pharmacological used described above, it is preferred that the $PGE_1$-type compound be in free acid form, or in salt form which requires the free acid as starting material. Moreover, for some of the pharmacological uses described above, formula IX, XII, XV, or XVIII $PGF_1$-type compounds of formula X, XIII, XVI, or XIX $PGA_1$-type compounds in free acid form or salt form are preferred. Formula IX, XII, XV and XVIII $PGF_1$-type esters are easily saponified to free acids by procedures known in the art. However, it is difficult to hydrolyze or saponify the $PGE_1$-type esters or the $PGA_1$-type esters to free acids without unwanted structural changes in the desired acids. When a formula VIII, XI, XIV, or XVII $PGE_1$-type free acid ($R_1$ is hydrogen) is desired, an ester wherein $R_1$ ($R_2$) is ethyl substituted in the beta-position with 3 chloro, 2 or 3 bromo, or one, 2, or 3 iodo is used as a starting material. Such esters, for example, wherein $R_1$ ($R_2$) is —$CH_2CCl_3$, are transformed to free acids by treatment with zinc metal and an alkanoic acid of 2 to 6 carbon atoms, preferably acetic acid. Zinc dust is preferred as the physical form of the zinc. Mixing the halo ester with the zinc dust at about 25°C. for several hours in the presence of the alkanoic acid causes replacement of the haloethyl moiety with hydrogen. The free acid is then isolated from the reaction mixture by procedures known in the art and exemplified below. For prepartion of the free acids of formulas VIII, XI, XIV, and XVII in this manner, the β, β,β-trichloroethyl esters are preferred. This same procedure is also used to prepare PGF$_{1\alpha}$, PGF$_{1\beta}$ and PGA$_1$ type free acids (R$_1$ is hydrogen), starting with the corresponding haloethyl ester. However, as mentioned above, this procedure is not necessary to prepare PGF$_1$-type acids.

These formula VIII, XI, XIV, and XVII haloethyl esters, i.e., wherein R$_1$ is ethyl substituted in the beta-position with 3 chloro, 2 or 3 bromo, or one, 2, or 3 iodo, are prepared in several ways. Some of these are outlined in Chart C. The haloethyl esters are also prepared by alkylation of a formula XXIII exo intermediate or a formula XXIV endo intermediate with the haloethyl esters of the ω-bromo or ω-iodo alkanoic acid.

Chart C describes the transformation of a formula XX olefin ester other than a haloethyl ester to haloethyl esters of a formula XXI glycol. Thus, Chart C relates only to PGE$_1$-type products of formula VIII, as does Chart B. However, as for Chart B, similar reactions are available leading to the PGE$_1$-type products of formulas XI, XIV and XVII. In Chart C, formula XXC is the same as formula XX (Chart B) except that haloethyl esters are not included in XXC. In other words, R$_4$ has the same definition as R$_2$ except that R$_4$ does not include ethyl substituted in the beta-position with 3 chloro, 2 or 3 iodo, or one, 2, or 3 iodo. Also in Chart C, ~ is as defined above, A is —(CH$_2$)$_a$—Y wherein $a$ and Y are as defined above and Q is —(CH$_2$)$_n$—Z— wherein $n$ and Z are as defined above.

CHART C

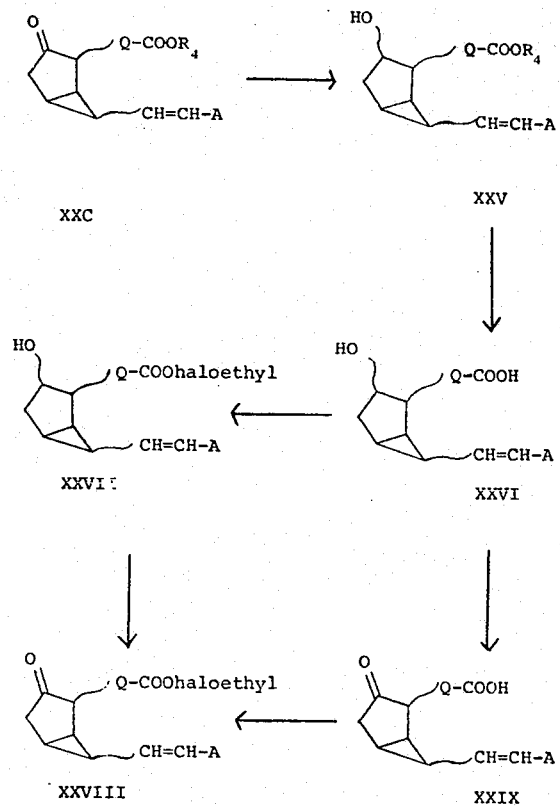

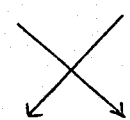

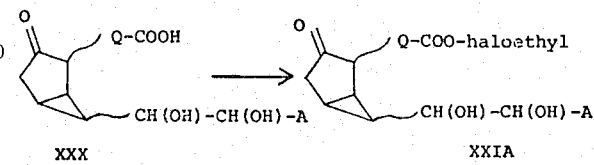

To make the desired formula XXIA haloester, it is necessary at some stage to saponify the —COOR$_4$ moiety to —COOH and then esterify that with the appropriate haloethanol, e.g., CCl$_3$CH$_2$OH. Formula XXC olefin esters and formula XXIA glycol esters each have a ring carbonyl group adjacent to the point of attachment of —Q—COOR$_4$ to the ring. Saponification of such a keto ester is likely to lead to isomerization such that an alpha-attached chain will change partly to a beta-attached chain, and a beta partly to an alpha. Therefore, keto ester XXC is reduced, for example, with sodium borohydride according to known procedures described above and exemplified below, to hydroxy ester XXV. This hydroxy ester is then saponified to hydroxy acid XXVI, also by known procedures.

Three reactions are necessary to transform hydroxy acid XXVI to keto glycol haloester XXIA. The ring hydroxy is oxidized back to a ring carbonyl, the carboxyl is esterified with a haloethanol, and the —CH=CH— is hydroxylated to —CH(OH)—CH(OH)—. As shown in Chart C, these three reactions are carried out in any of three sequences, i.e., XXVI to XXVII to XXVIII to XXIA, XXVI to XXIX to XXVIII to XXIA, and XXVI to XXIX to XXX to XXIA. Of these, the last is preferred.

For the oxidation of XXVI to XXIX or XXVII to XXVIII, an especially useful reagent is the Jones reagent, i.e., acidic chromic acid. See J. Chem. Soc. 39 (1946). Acetone is a suitable diluent for this purpose, and a slight excess of oxidant and temperatures at least as low as about 0°C., preferably about —10° to about —20° C. should be used. The oxidation proceeds rapidly and is usually complete in about 5 to about 30 minutes. Excess oxidant is destroyed, for example, by addition of a lower alkanol, advantageously isopropyl alcohol, and the aldehyde is isolated by conventional methods, for example, by extraction with a suitable solvent, e.g., diethyl ether. Other oxidizing agents can also be used. Examples are mixtures of chromium trioxide and pyridine or mixtures of dicyclohexylcarbodiimide and dimethyl sulfoxide. See, for example, J. Am. Chem. Soc. 87, 5661 (1965).

For the esterification to haloethyl esters XXVII, XXVIII, or XXIA, the acid is reacted with the appropriate haloethanol, e.g., β, β, β-trichloroethanol, in the presence of a carbodiimide, e.g., dicyclohexylcarbodiimide, and a base, e.g., pyridine, preferably in the presence of an inert liquid diluent, e.g., dichloromethane, for several hours at about 25° C.

The PGE$_1$, PGF$_{1\alpha}$, PGF$_{1\beta}$, and PGA$_1$ type free acids of formulas VIII to XIX are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent or either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

Molecules of each of the compounds encompassed by formulas I to IV, VI to XXII, and XXV to XXX each have at least one center of asymmetry, and each can exist in racemic form and in either enantiomeric form, i.e., d and l. A formula accurately defining the d form would be the mirror image of the formula which defined the l form. Both formulas are necessary to define accurately the corresponding racemic form. For convenience, the various formulas herein and in the claims are to be construed as including racemic (dl), d, and l compounds. However, for the above-described pharmacological purposes, preferred compounds are the racemic compounds of formulas VIII to XIX and the optically active enantiomers of those compounds with the same absolute configuration as the $PGE_1$ obtained from certain mammalian tissues, for example: sheep vesicular glands and human seminal plasma, or compounds obtained by carbonyl reduction or acid dehydration of a compound so obtained. The specific compounds shown in the formulas I, II, III, and IV are intended to represent that absolute configuration. See nature 212, 38 (1966).

Hereinafter, names of specific final products of formulas VIII to XIX will be based on relationship to the optically active compound of formula I, i.e., $PGE_1$. Substituents and structural variations will be based on the numbering of formula V, i.e., prostanoic acid; thus, for example, 2,2-dimethyl-19-methyl-$PGE_1$ or 2-fluoro-19,19-difluoro-$PGA_1$. An alpha or S configuration of the hydroxy at C-15 will be assumed unless $15\beta$ appears before the name. An alpha configuration at C-8 will also be assumed unless $8\beta$ appears before the name. An optically active compound with the same absolute configuration of $PGE_1$ will be assumed unless dl (racemic) or ent (optically active unnatural configuration) appear before the name.

When an optically active (d or l) final compound is desired, that is made by resolution of the racemic compound or by resolution of one of the asymmetric racemic intermediates. These resolutions are carried out by procedures known in the art. For example, when a final compound or an asymmetric intermediate is a free acid, the dl form thereof is resolved into the d and l forms by reacting said free acid by known general procedures with an optically active base, e.g., brucine or strychnine, to give a mixture of two diastereoisomers which are separated by known general procedures, e.g., fractional crystallization, to give the separate diastereoisomeric salts. The optically active acid is then obtained by treatment of the salt with an acid by known general procedures.

Alternatively, exo or endo bicyclo[3,1,0]hexane olefin reactants XX or XXIX are transformed to ketals with an optically active 1,2-glycol, e.g., D(-) 2,3-butanediol, by reaction of said 1,2-glycol with the olefin in the presence of a strong acid, e.g., p-toluenesulfonic acid. The resulting ketal is a mixture of diastereoisomers which is spearated into the d and l diastereoisomers, each of which is then hydrolyzed with an acid, e.g., oxalic acid, to the original keto compound, now in optically active form. These reactions involving optically active glycols and ketals for resolution purposes are generally known in the art. See, for example, Chem. Ind. 1664 (1961) and J. Am. Chem. Soc. 84,2938 (1962). Dithiols may be used instead of glycols.

The invention can be more fully understood by the following examples and preparations.

All temperatures are in degrees centigrade.

The collection of chromatographic eluate fractions starts when the eluant front reaches the bottom of the column.

PREPARATION 1

Endo-bicyclo[3.1.0]hexan-3-ol-6-carboxylic acid methyl ester.

A mixture of endo-bicyclo[3.1.0]hex-2-ene-6-carboxylic acid methyl ester (103 g.) and anhydrous diethyl ether (650 ml.) is stirred under nitrogen and cooled to −5° C. A one molar solution (284 ml.) of diborane in tetrahydrofuran is added dropwise during 30 minutes while keeping the temperature below 0°C. The resulting mixture is then stirred and allowed to warm to 25° C. during 3 hours. Evaporation under reduced pressure gives a residue which is dissolved in 650 ml. of anhydrous diethyl ether. The solution is cooled to 0° C., and 3 normal aqueous sodium hydroxide solution (172 ml.) is added dropwise under nitrogen and with vigorous stirring during 15 minutes, keeping the temperature at 0° to 5° C. Next, 30% aqueous hydrogen peroxide (94 ml.) is added dropwise with stirring during 30 minutes at 0° to 5° C. The resulting mixture is stirred an hour while warming to 25° C. Then, 500 ml. of saturated aqueous sodium chloride solution is added, and the diethyl ether layer is separated. The aqueous layer is washed with four 200-ml. portions of ethyl acetate, the washings being added to the diethyl ether layer, which is then washed with saturated aqueous sodiuum chloride solution, dried, and evaporated to give 115 g. of a residue. This residue is distilled under reduced pressure to give 69 g. of a mixture of the methyl esters of endo-bicyclo[3.1.0]hexan-3-ol-6-carboxylic acid and endo-bicyclo[3.1.0]hexan-2-ol-6-carboxylic acid; b.p. 86°–95° C. at 0.5 mm.

PREPARATION 2

Endo-bicyclo[3.1.0]hexan-3-ol-6-carboxylic acid methyl ester tetrahydropyranyl ether The 2-ol and 3-cl mixture (66 g.) obtained according to Preparation 1 to 66 ml. of dihydropyran is stirred and cooled at 15°–20° C. during addition of 3 ml. of anhydrous diethyl ether saturated with hydrogen chloride. The temperature of the mixture is then kept in the range 20° to 30°C. for 1 hour with cooling, and is then kept at 25° for 15 hours. Evaporation gives a residue which is distilled under reduced pressure to give 66 g. of a mixture of the methyl esters-tetrahydropranyl ethers of endo-bicyclo-[3.1.0]hexan-3-ol-6-carboxylic acid and endo-bicyclo [3.1.0.]-hexan-2-ol-6-carboxylic acid; b.p. 96°–104° C. at 0.1 mm.

PREPARATION 3

Endo-6-hydroxymethylbicyclo[3.1.0]hexan-3-ol 3-tetrahydropyranyl ether.

A solution of the mixture (66 g.) of products obtained according to Preparation 2 in 300 ml. of anhydrous diethyl ether is added dropwise during 45 minutes to a stirred and cooled mixture of lithium aluminum hydride (21 g.) in 1300 ml. of anhydrous diethyl ether under nitrogen. The resulting mixture is stirred 2 hours at 25°C., and is then cooled to 0° C. Ethyl acetate (71 ml.) is added, and the mixture is stirred 15 minutes. Water (235 ml.) is then added, and the diethyl ether layer is separated. The water layer is washed twice with diethyl ether and twice with ethyl acetate. A solution of Rochelle salts is added to the aqueous layer, which is then saturated with sodium chloride and extracted twice with ethyl acetate. All diethyl ether and ethyl acetate solutions are combined, washed with saturated aqueous sodium chloride solution, dried, and evaporated to give 61 g. of a mixture of the 3-tetrahydropyranyl ethers of endo-6-hydroxymethylbicyclo[3.1.0]hexan-3-ol and endo-6-hydroxymethylbicyclo[ 3.1.0]hexan-2-ol.

PREPARATION 4

Endo-bicyclo [3.1.0]hexan-3-ol-6-carboxaldehyde 3-tetrahydropyranyl ether

A solution of the mixture (34 g.) of products obtained according to Preparation 3 in 1000 ml. of acetone is cooled to −10° C. Jones reagent (75 ml. of a solution of 21 g. of chromic anhydride, 60 ml. of water, and 17 ml. of concentrated sulfuric acid), precooled to 0° C., is added dropwise with stirring during 10 minutes at −10° C. After 10 minutes of additional stirring at −10° C., isopropyl alcohol (35 ml.) is added during 5 minutes, and stirring is continued for 10 minutes. The reaction mixture is then poured into 8 l. of an ice and water mixture. The resulting mixture is extracted 6 times with dichloromethane. The combined extracts are washed with aqueous sodium bicarbonate solution, dried, and evaporated to give 27 g. of a mixture of the tetrahydropyranyl ethers of endo-bicyclo[3.1.0]hexan-3-ol-6-carboxaldehyde and endo-bicyclo[3.1.0]hexan-2-ol-6-carboxaldehyde.

EXAMPLE 1 dl 2,2-Dimethyl-20,20-Dimethyl-$PGE_1$ Methyl Ester and dl 15$\beta$-2,2-Dimethyl-20,20-Dimethyl-$PGE_1$ Methyl Ester.

A. A solution of 6-methyl-1-bromoheptane (131 g.) and triphenylphosphine (180g.) in 350 ml. of toluene is heated at reflux for 16 hours under nitrogen. The mixture is cooled, and the solid product is removed by filtration, washed with toluene, and dried to give 220 g. of (6-methylheptyl)-triphenylphosphonium bromide.

B. A suspension of (6-methylheptyl)-triphenylphosphonium bromide (305 g.) in 3 l. of benzene is mixed gradually with 400 ml. of 15% butyllithium in hexane during 15 minutes. The mixture is stirred 1 hour at 35° c., and then cooled to 20° C. To this mixture is added a solution of a mixture of aldehydes (100 g.) obtained according to Preparation 4 in 200 ml. of benzene. This mixture is heated at 70° C. for 2.5 hours, and then cooled and filtered. The filtrate is washed with water, dried with sodium sulfate, and evaporated to give an olefin mixture.

C. The olefin mixture (340 g.) is dissolved in 4 l. of methanol containing 8.4 g. of oxalic acid. This solution is heated at reflux for 1.5 hours. The methanol is then removed under reduced pressure, and the residue is mixed with water and extracted repeatedly with dichloromethane. The dichloromethane extracts are combined, washed successively with aqueous sodium bicarbonate and brine, dried with sodium sulfate, and evaporated. The residue (120 g.) is chromatographed on 1.5 kg. of silica gel. Elution with 10–15% ethyl acetate in Skellysolve B (a mixture of isomeric hexanes) give 75.5 g. of a mixture of alcohols; infrared absorption at 3300, 1460, 1440, 1180, 1120, 745, 725, and 697 $cm^{-1}$.

D. Jones reagent (133 ml., see Preparation 4) is added dropwise to a solution of the above-described alcohol mixture (75.5 g.) in 2 l. of acetone at −10° C. After 10 minutes at −10° C., 75 ml. of isopropyl alcohol is added, and the mixture is poured into 8 l. of water. This mixture is extracted repeatedly with dichloromethane. The combined extracts are washed successively with dilute hydrochloric acid, aqueous sodium bicarbonate, and brine, and then dried with sodium sulfate. Evaporation under reduced pressure gives 65 g. of a residue which is chromatographed on 2.5 kg. of a silica gel. Elution with 2.5% ethyl acetate in Skellysolve B gives 30.3 g. of 6-endo-(7-methyl-1-octenyl)-3-oxobicyclo[3.1.0]hexan-2-one; infrared absorption at 1750, 1460, 1400, 1260, 1145, and 770 $cm^{-1}$.

E. A solution of potassium tert-butoxide (23.2 g.) and dicyclohexyl-18-crown-6 (23.2 g.; See J. Am. Chem. Soc. 89,7017 (1967)) in 1300 ml. of tetrahydrofuran is added gradually with stirring during 50 minutes to a solution of 6-endo-(7-methyl-1-octenyl)-3-oxobicyclo[3.1.0]hexane-2-one (19.5 g.) and methyl 7-iodo-2,2-dimethylheptanoate (45 g.) in 660 ml. of tetrahydrofuran. Then, 100 ml. of 2.5 M hydrochloric acid is added to the mixture, and that mixture is poured into brine and extracted repeatedly with diethyl ether.

The combined extracts are washed successively with aqueous sodium thiosulfate, aqueous sodium bicarbonate, and brine, dried with sodium sulfate, and evaporated under reduced pressure. The residue is chromatographed on 5 kg. of silica gel. After eluting with 2.5–5% ethyl acetate in Skellysolve B to remove unreacted starting materials, elution with additional 5% ethyl acetate in Skellysolve B gives methyl 6-endo-(7-methyl-1-octenyl)-3-oxobicyclo[3.1.0]hexane-2α-(2,2-dimethylheptanoate). Further elution with 5–10% ethyl acetate in Skellysolve B gives methyl 6-endo-(7-methyl-1-octenyl)-3-oxobicyclo[3.1.0]hexane-2β-(2,2-dimethylheptanoate).

F. A solution of 1.0 g. of methyl 6-endo-(7-methyl-1-octenyl)-3-oxobicyclo[3.1.0]hexane-2α-(2,2-dimethylheptanoate) in 13.5 ml. of tetrahydrofuran is warmed to 50° C., and a warm solution of 530 mg. of potassium chlorate and 35 mg. of osmium tetroxide in 6.5 ml. of water is added with stirring. The mixture is stirred for 5 hours at 50°C.; then it is concentrated under reduced pressure to remove the tetrahydrofuran. The mixture is diluted with water and extracted with 3 portions of dichloromethane. The dichloromethane extracts are combined, washed with water, dried over sodium sulfate, and evaporated under reduced pressure to give an oil. The oil is chromatographed over 120 g. of silica gel. The column is eluted with 500 ml. of 10%, 1000 ml. of 25%, 1000 ml. of 35%, 1000 ml. of 45%, 1000 ml. of 50%, and 1000 ml. of 60% ethyl acetate in Skellysolve B. The 35% ethyl acetate eluate is concentrated to give the less polar form of methyl 6-endo-(7methyl-1,2-dihydroxyoctyl) -3-oxobicyclo[3.1.0-]hexane -2α-(2,2-dimethylheptanoate). The 50% ethyl acetate eluate is concentrated to give the more polar form.

G. A solution of 0.255 g. of methyl 6-endo-(7-methyl-1,2-dihydroxyoctyl)-3-oxobicyclo[3.1.0]hexane-2-(2,2-dimethylheptanoate) (less polar glycol, obtained as above) in 7 ml. of pyridine is stirred under nitrogen while cooling in an ice bath, and 0.7 ml. of methanesulfonyl chloride is added. Stirring is continued for 2.5 hours. The solution is diluted with 30 ml. of ice and water, and stirred for 10 minutes; then it is tranferred to a separatory funnel containing crushed ice and extracted with 3 100-ml. portions of ethyl acetate. The ethyl acetate extracts are combined, washed with cold 10% sulfuric acid, cold 10% sodium carbonate, and ice water, then dried over sodium sulfate, and evaporated to give dimesylate as an oil. This oil is dissolved in 8 ml. of acetone, diluted with 4 ml. of water, and allowed to stand at 25° C. for about 20 hours. The reaction mixture is then diluted with 25 ml. of water and concentrated under reduced pressure to remove acetone; then 50 ml. of water is added and the mixture is extracted three times with ethyl acetate. The ethyl acetate extracts are combined, washed with saturated aqueous sodium bicarbonate and saturated aqueous sodium chloride, dried over sodium sulfate, and evaporated to give an oil.

Following the above procedure, but starting with the more polar glycol (248 mg., obtained as above), there is obtained an oil identical by thin layer chromatographic analysis to the oil obtained above from the less polar glycol. These two oils are combined and chromatographed over 70 g. of silica gel. The column is eluted with 0.6 l. of 20%, 1 l. of 35%, 1 l. of 40%, 1 l. of 50%, and 3 l. of 75% ethyl acetate in Skellysolve B, then with 1 l. of ethyl acetate, and 1 l. of 5% MeOH in ethyl acetate, taking 75-ml. fractions. Eluate fractions 67 to 73 are evaporated and combined to give dl 15β-2,2-dimethyl-20,20-dimethyl-PGE$_1$ methyl ester.

Eluate fractions 88 to 104 are evaporated and combined to give dl 2,2-dimethyl-20,20-dimethyl-PGE methyl ester. This is crystallized from a mixture of ether and Skellysolve B to give dl 2,2-dimethyl-20,20-dimethyl-PGE$_1$.

EXAMPLE 2 dl 8β-3,3-Dimethyl-20,20-Dimethyl-PGE$_1$ Methyl Ester and dl 8β,15β-3,3-Dimethyl-20,20-Dimethyl-PGE$_1$ Methyl Ester Following the procedures of Example 1, parts E, F and G, but using methyl 7-iodo-3,3-dimethylheptanoate in place of methyl 7-iodo-2,2-dimethylheptanoate in part E, the obtained methyl 6-endo-(7-methyl-1-octenyl)-3-oxobicylo [3.1.0]hexane-2.62-(3.3-dimethylheptanoate), is transformed to dl 8β-3,3-dimethyl-20,20-dimethyl-PGE$_1$ methyl ester and dl 8β, 15β-3,3-dimethyl-20,20-dimethyl-PGE$_1$ methyl ester.

EXAMPLE 3 dl 2-Fluoro-19,19-Dimethyl-PGE$_1$ Methyl Ester and dl 15β-2-Fluoro-20,20-Dimethyl-PGE$_1$ Methyl Ester A. Following the procedures of Example 1, parts A, B, C, D, and E, but starting wtih 5,5-dimethyl-1-bromohexane rather than 6-methyl-1-bromoheptane, and using methyl 7-iodo-2-fluoroheptanoate in place of methyl 7-iodo-2,2-dimethylheptanoate, there are obtained methyl 6-endo-(6,6-dimethyl-1-heptenyl)-3-oxobicyclo[3.1.0]hexane-2α-(2-fluoroheptanoate) and the more polar methyl 6-endo-(6,6-dimethyl-1-heptenyl)-3-oxobicyclo[3.1.0]hexane-2β-(2-fluoroheptanoate).

B. A solution of 12.0 g. of methyl 6-endo-(6,6-dimethyl-1-heptenyl)-3-oxobicyclo[3.1.0]hexane-2α-(2-fluoroheptanoate), as above, in 150 ml. of tetrahydrofuran is warmed to 50° C. and stirred under nitrogen; then 1 g. of solid osmium tetroxide is added to the solution followed immediately by a warm solution of 6.5 g. of potassium chlorate in 76 ml. of water, added in one portion. The reaction mixture is stirred for 5 hours at 50°C. under nitrogen; then it is concentrated under reduced pressure to remove the tetrahydrofuran. The mixture is diluted with water and extracted three times with dichloromethane. The dichloromethane extracts are combined, washed with water, dried over sodium sulfate, and evaporated under reduced pressure to give 14.0 g. of an oil. The oil is chromatographed over 2 kg. of silica gel. The column is eluted with 8 l. of 15%, 12 l. of 25%, 16 l. of 35%, 16 l. of 45% and 8 l. of 60% ethyl acetate in Skellysolve B, taking 600 ml. fractions. Fractions 22 to 66 are evaporated and combined to give methyl 6-endo-(6,6-dimethyl-1,2-dihydroxyheptyl)-3-oxobicyclo[3.1.0]hexane-2α-(2-fluoroheptanoate).

C. A solution of 9.0 g. of methyl 6-endo-(6,6-dimethyl-1,2-dihydroxyheptyl)-3-oxobicyclo[3.1.0]hexane- 2α-(2-fluoroheptanoate), obtained as above, in 110 ml. of pyridine is stirred under nitrogen and cooled in an ice bath while 10.7 ml. of methanesulfonyl chloride is added dropwise over a period of 15 minutes. The mixture is stirred for 2.5 hours at 0° C, then is cooled to −10° to −15° C. with a dry ice-acetone bath and 10 ml. of ice and water is added slowly, with good stirring, while keeping the temperature below 0°C. The mixture is poured into 500 ml. of ice and water. Then 200 ml. of cold 1:3 dichloromethane-ether mixture and 440 ml. of cold 3 N hydrochloric acid are added, and the mixture is separated rapidly. The mixture is extracted three more times with 200-ml. portions of cold 1:3 dichloromethanediethyl ether mixture. The dichloromethane-diethyl ether extracts are combined, washed with cold 2% sulfuric acid, cold 10% aqueous sodium carbonate, and cold saturated aqueous sodium chloride, then dried over sodium sulfate and potassium carbonate and evaporated to give an oil. This oil is dissolved in 450 ml. of 2:1 acetone-water and allowed to stand at about 25° C. for about 20 hours. The reaction mixture is diluted with 200 ml. of water and concentrated under reduced pressure to remove acetone. Then, 100 ml. of water is added and the mixture is extracted 4 times with ethyl acetate. The ethyl acetate extracts are washed with aqueous sodium bicarbonate and aqueous sodium chloride, dried over sodium sulfate, and evaporated to give an oil. This oil is chromatographed over 1.6 kg. of silica gel. The column is eluted with 4 l. of 20%, 8 l. of 30%, 8 l. of 40%, 20 l. of 60%, and 20 l. of 80% ethyl acetate in Skellysolve B, then 20 l. of ethyl acetate and 4 l. of 5% methanol in ethyl acetate, taking 600-ml. fractions. Eluate fractions 66 to 72 are evaporated and combined to give dl 15β-2-fluoro-19,19-dimethyl-PGE$_1$ methyl ester.

Eluate fractions 96–111 are evaporated and combined to give dl 2-fluoro-19,19-dimethyl-PGE$_1$ methyl ester. This is crystallized from a mixture of ether and Skellysolve B to give dl 2-fluoro-19,19-dimethylprostaglandin E$_1$ methyl ester.

EXAMPLE 4 dl 8β-2-Fluoro-19,19-Dimethyl-PGE$_1$ Methyl Ester and dl 8β, 15β-2-Fluoro-19,19-Dimethyl-PGE$_1$ Methyl Ester Following the procedure of Example 3, parts B and C, methyl 6-endo-(6,6-dimethyl-1-heptenyl)-3-oxobicyclo[3.1.0]-hexane-2β-(2-fluoroheptanoate) from Example 3, part A is transformed to dl 8β-2-fluoro-19,19-dimethyl-PGE$_1$ methyl ester and dl 8β,15β-2-fluoro-19,19-dimethyl-PGE$_1$ methyl ester.

EXAMPLE 5 dl 2-Methyl-19-Methyl-PGE$_1$ Methyl Ester and dl 15β-2-Methyl-19-Methyl-PGE$_1$ Methyl Ester A. Following the procedure of Example 1, parts A, B, C, D, and E, but starting with 5-methyl-1-bromohexane rather than 6-methyl-1-bromoheptane and using methyl 7-iodo-2-methylheptanoate, in place of 7-iodo-2,2-dimethylheptanoate, there are obtained methyl 6-endo-(6-methyl-1-heptenyl)-3-oxobicyclo[3.1.0]hexane-2α-(2-methylheptanoate) and methyl 6-endo-(6-methyl-1-heptenyl)-3-oxobicyclo[3.1.0]hexane-2β-(2-methylheptanoate).

B. Following the procedure of Example 1, parts F and G, but using methyl 6-endo-(6-methyl-1-heptenyl)-3-oxobicyclo[3.1.0]hexane-2α-(2-methylheptanoate) as a reactant in part F, there are obtained dl 2-methyl-19-methyl-PGE$_1$ methyl ester and dl 15β-2-methyl-19-methyl-PGE$_1$ methyl ester.

EXAMPLE 6 dl 8β-2-Methyl-19-Methyl-PGE$_1$ Methyl Ester and dl 8β,15β-2-Methyl-19-Methyl-PGE$_1$ Methyl Ester Following the procedure of Example 1, parts F and G, but using methyl 6-endo-(6-methyl-1-Heptenyl)-3-oxobicyclo-[3.1.0]hexane-2β-(2-methylheptanoate) (Example 5, part A) as a reactant, there are obtained dl 8β-2-methyl-19-methyl-PGE$_1$ methyl ester and dl 8β,15β-2-methyl-19-methyl-PGE$_1$ methyl ester.

EXAMPLE 7 dl 2,2-Dimethyl-19,19,20,20,20-Pentafluoro-PGE$_1$ Methyl Ester and dl 15β-2,2-dimethyl-19,19,20,20,20-Pentafluoro-PGE$_1$ Methyl Ester A. Following the procedure of Example 1, parts A, B, C, D, and E, but starting with 1,1,1,2,2-pentafluoro-6-iodohexane rather than 6-methyl-1-bromohexane, there are obtained methyl 6-endo-(6,6,7,7,7-pentafluoro-1-heptenyl)-3-oxobicyclo[3.1.0]hexane-2α-(2,2-dimethylheptanoic acid) and methyl 6-endo-(6,6,7,7,7-pentafluoro-1-heptenyl)-3-oxobicyclo[3.1.0]hexane-2β-(2,2-dimethylheptanoic acid).

B. Following the procedure of Example 1, parts F and G, but using methyl 6-endo-(6,6,7,7,7-pentafluoro-1-heptenyl)-3-oxobicyclo[3.1.0]hexane-2α-(2,2-dimethylheptanoate) as a reactant, there are obtained dl 2,2-dimethyl-19,19,20,20,20-pentafluoro-PGE$_1$ methyl ester and dl 15β-2,2-dimethyl-19,19,20,20,20-pentafluoro-PGE$_1$ methyl ester.

EXAMPLE 8 dl 8β-2-fluoro-19,19,20,20,20-Pentafluoro-PGE$_1$ Methyl Ester and dl 8β,15β-2-fluoro-19,19,20,20,20-Pentafluoro-PGE$_1$ Methyl Ester Following the procedures of Example 1, parts F and G, but using methyl 6-endo-(6,6,7,7,7-pentafluoro-1-heptenyl)-3-oxobicyclo[3.1.0]hexane-2β-2-fluoroheptanoate as a reactant, there are obtained dl 8β-2-fluoro-19,19,20,20,20-pentafluoro-PGE$_1$ methyl ester and dl 8β,15β-2-fluoro-19,19,20,20,20-pentafluoro-PGE$_1$ methyl ester.

Following the procedures of Examples 1–8 but using exo reactants rather than endo reactants, the same PGE$_1$-type methyl esters are obtained.

Also following the procedures of Examples 1–8 but using separately as reactants the ethyl 2-ethylhexyl, phenyl, benzyl, cyclohexyl, and β, β, β-trichloroethyl esters of the various substituted 7-iodo-heptanoic acids in place of methyl esters, there are obtained the 8α—15α, 8α—15β, 8β—15α, and 8β–15β forms of the corresponding esters of 20,20-dimethyl, 19,19-dimethyl, 19-methyl, 19,19,20,20,20-pentafluoro, combined with 2,2-dimethyl, 3,3-dimethyl, or 2-fluoro, analogs of dl-PGE$_1$.

Also following the procedures of Examples 1–8 but using separately as reactants both optically active enantiomers of the methyl, ethyl, 2-ethylhexyl, phenyl, benzyl, cyclohexyl, and $\beta,\beta,\beta$-trichloroethyl esters of the various 6-endo-(substituted-1-alkenyl)-3-oxobicyclo[3.1.0]hexane-2-substituted heptanoic acid reactants defined in those examples, there are obtained the 8$\alpha$—15$\alpha$,8$\alpha$—15$\beta$, 8$\beta$—15$\alpha$, and 8$\beta$—15$\beta$ forms of the corresponding esters of 20,20-dimethyl, ent 20,20-dimethyl, 19,19-dimethyl, ent 19,19-dimethyl, 19-methyl, ent 19-methyl, 19,19,20,20-pentafluoro, and ent 19,19,20,20,20-pentafluoro, combined with 2,2-dimethyl, ent 2,2-dimethyl, 3,3-dimethyl, ent 3,3-dimethyl, 2-fluoro or ent 2-fluoro, analogs of PGE$_1$.

Also following the procedures of Example 1 but using as pairs of reactants in place of the 6-methyl-1-bromoheptane and the methyl 7-iodo-2,2-dimethylheptanoate, pairs of (1) alkyl bromide or fluoroalkyl bromide and (2) $\omega$ iodo-alkanoate ester selected from the following lists, the corresponding PGE$_1$-type esters are produced:

```
I—(CH₂)₅CH(CH₃)—COOR₅        CH₃CF₂(CH₂)₄Br
I—(CH₂)₅CH(C₂H₅)—COOR₅       CHF₂(CH₂)₅Br
I—(CH₂)₅CH(CH₃)C-             CF₃(CH₂)₅Br
 H₂—COOR₅
I—(CH₂)₄CH(C₂H₅)C-            CHF₂CF₂(CH₂)₄Br
 H₂—COOR₅
I—(CH₂)₅C(C₂H₅)₂—COOR₅        CF₃CF₂(CH₂)₄Br
I—(CH₂)₄C(C₂H₅)₂C-            CHF₂(CH₂)₅Br
 H₂—COOR₅
I—(CH₂)₄CHFCH₂—COOR₅          CF₃(CH₂)₅Br
I—(CH₂)₅CF₂—COOR₅             CH₃CF₂(CH₂)₄Br
I—(CH₂)₄CF₂CH₂—COOR₅          CF₃CF₂(CH₂)₃Br
I—(CH₂)₅C(CH₃)₂—COOR₅         CF₃(CH₂)₇Br
I—(CH₂)₅C(CH₃)₂C-             CH₃CF₂(CH₂)₂Br
 H₂—COOR₅
I—(CH₂)₄CHF—COOR₅             (CH₃)₂CH(CH₂)₄Br
I—(CH₂)₅CHFCH₂—COOR₅          (CH₃)₂CH(CH₂)₅Br
I—(CH₂)₃CH(CH₃)—COOR₅         (CH₃)₂CH(CH₂)₂Br
I—(CH₂)₃C(CH₃)₂C-             (CH₃)₂CH(CH₂)₃Br
 H₂—COOR₅
I—(CH₂)₂CHF—COOR₅             (CH₃)₃C(CH₂)₄Br
I—(CH₂)₂C(CH₃)₂—COOR₅         (CH₃)₃C(CH₂)₂Br
I—(CH₂)₄C(CH₃)₂C-
 H₂—COOR₅
I—(CH₂)₃CHF-COOR₅
I—(CH₂)₇C(CH₃)₂—COOR₅
I—(CH₂)₂C(CH₃)₂C-
 H₂—COOR₅
I—(CH₂)₄CHF—COOR₅
``` wherein R$_5$ is methyl, ethyl, 2-ethylhexyl, phenyl, benzyl, cyclohexyl, or $\beta,\beta,\beta$-trichloroethyl.

EXAMPLE 9 dl 3,3-Dimethyl-20,20-Dimethyl-PGE$_1$

A solution of the $\beta,\beta,\beta$-trichloro-ethyl ester of dl 3,3-dimethyl-20,20-dimethyl-PGE$_1$ (50 mg.) in 5 ml. of 90% acetic acid is stirred with 400 mg. of zinc dust for 2 hours at 25°C. Ethyl acetate (40 ml.) is added, and the mixture is decanted from the unused zinc, washed four times with water and then with brine, dried with sodium sulfate, and evaporated. The residue is chromatographed on silica gel, eluting with a 50–100% gradient of ethyl acetate in Skellysolve B, and then with 5% methanol in ethyl acetate. The fractions which show TLC like PGE$_1$ are combined to give dl 3,3-dimethyl-20,20-dimethyl-PGE$_1$.

Following the procedure of Example 9, dl 8$\beta$-3,3-dimethyl-20,20-dimethyl-PGE$_1$, dl 15$\beta$-3,3-dimethyl-20,20-dimethyl-PGE$_1$, dl 8$\beta$,15$\beta$-3,3-dimethyl-20,20-dimethyl-PGE$_1$, 3,3-dimethyl-20,20-dimethyl-PGE$_1$, 8$\beta$-3,3-dimethyl-20,20-dimethyl-PGE$_1$, 15$\beta$-3,3-dimethyl-20,20-dimethyl-PGE$_1$, 8$\beta$,15$\beta$-3,3-dimethyl-20,20-dimethyl-PGE$_1$, and the corresponding ent compounds are each obtained from the corresponding $\beta,\beta,\beta$-trichloroethyl esters.

Also following the procedure of Example 9, the 8$\alpha$—15$\alpha$, 8$\alpha$—15$\beta$,8$\beta$—15$\alpha$,and 8$\beta$—15$\beta$ forms of dl and both optically active forms of 2-fluoro-19,19-dimethyl-PGE$_1$, 2-methyl-19-methyl-PGE$_1$, 2,2-dimethyl-19,19,20,20,20-pentafluoro-PGE$_1$ and 2-fluoro-19,19,20,20,20-pentafluoro-PGE$_1$ are obtained from the corresponding $\beta,\beta,\beta$-trichloroethyl esters.

Also following the procedure of Example 9, each of the other PGE$_1$-type $\beta,\beta,\beta$-trichloroethyl esters described after Example 8, above, is transformed to the corresponding PGE$_1$-type acid.

EXAMPLE 10 dl 2-methyl-19-Methyl-PGA$_1$ Methyl Ester

A solution of 200 mg. of dl 2-methyl-19-methyl-PGE$_1$ methyl ester in a mixture of 2 ml. of tetrahydrofuran and 2 ml. of 0.5 N hydrochloric acid is stirred under nitrogen at 25°C. for 5 days. The reaction mixture is then diluted with saturated aqueous sodium chloride and extracted with ethyl acetate. The ethyl acetate extract is washed with saturated aqueous sodium chloride, dried over sodium sulfate, and evaporated to give an oil. The oil is chromatographed over 25 g. of silica gel and eluted with 350 ml. of 20%, 400 ml. of 30%, 500 ml. of 40%, 1000 ml. of 50%, and 500 ml. of 60% ethyl acetate in Skellysolve B, then with 500 ml. of ethyl acetate, taking 25 ml. fractions. Eluate fractions 17–22 are concentrated and combined to give dl 2-methyl-19-methyl-PGA$_1$ methyl ester.

Following the procedure of Example 10, dl 15$\beta$-2-methyl-19-methyl-PGA$_1$ methyl ester, dl 8$\beta$-2-methyl-19-methyl-PGA$_1$ methyl ester, dl 8$\beta$,15$\beta$-2-methyl-19-methyl-PGA$_1$ methyl ester, and both optically active forms of each of those are obtained from the corresponding PGE$_1$-type ester.

Also following the procedure of Example 10, the ethyl, 2-ethylhexyl, phenyl, benzyl, and cyclohexyl esters of the 8$\alpha$—15$\alpha$,8$\alpha$—15$\beta$,8$\beta$—15$\alpha$, and 8$\beta$—15$\beta\lambda$ forms of the racemic and both optically active forms of 2-methyl-19-methyl-PGA$_1$ are obtained from the corresponding PGE$_1$-type compounds.

Also following the procedure of Example 10, the methyl, ethyl, 2-ethylhexyl, phenyl, benzyl, and cyclohexyl esters of the 8$\alpha$—15$\alpha$, 8$\alpha$—15$\beta$, 8$\beta$—15$\alpha$, and 8$\beta$—15$\beta$ forms of the racemic and both optically active forms of 2-fluoro-19,19-dimethyl-PGA$_1$, 2,2-dimethyl-20,20-dimethyl-PGA$_1$, 3,3-dimethyl-20,20-dimethyl-PGA$_1$, 2,2-dimethyl-19,19,20,20,20-pentafluoro-PGA$_1$ and 2-fluoro-19,19,20,20,20-pentafluoro-PGA$_1$ are obtained from the corresponding PGE$_1$-type compounds.

29

Also following the procedure of Example 10, the 8α—15α, 8α—15β, 8β—15α, and 8β—15β forms of the racemic and both optically active forms of 2-methyl-19-methyl-PGA$_1$, 2-fluoro-19,19-dimethyl-PGA$_1$, 2,2-dimethyl-20,20-dimethyl-PGA$_1$, and 2,2-dimethyl-19,19,20,20,20-pentafluoro-PGA$_1$ are obtained from the corresponding PGE$_1$-type acids.

Also following the procedure of Example 10, each of the PGE$_1$-type esters described after Example 8 and each of the PGE$_1$-type acids described after Example 9 is dehydrated to the corresponding PGA$_1$-type ester and acid.

EXAMPLE 11 dl 2-Fluoro-19,19-Dimethyl-PGF$_{1\alpha}$ and dl 2-Fluoro-19,19-Dimethyl-PGF$_{1\beta}$, and their Methyl Esters A solution of dl 2-fluoro-19,19-dimethyl-PGE$_1$ methyl ester (500 mg.) in 25 ml. of isopropyl alcohol is stirred at 0°C. under nitrogen, and a cold solution of 250 mg. of sodium borohydride in 5 ml. of water is added. The mixture is stirred at 0°C. for 2.5 hours, then 1 ml. of acetone is added and the mixture is stirred for 10 minutes at 0°C. The mixture is made slightly acidic (pH 5–6) with acetic acid, and is then concentrated under reduced pressure to remove the acetone and isopropyl alcohol. This mixture is poured into saturated aqueous sodium chloride and extracted 3 times with ethyl acetate. The ethyl acetate extracts are combined, washed with saturated aqueous sodium chloride, dried over sodium sulfate, and evaporated to give a mixture of dl 2-fluoro-19,19-dimethyl-PGF$_{1\alpha}$ methyl ester and dl 2-fluoro-19,19-dimethyl-PGF$_{1\beta}$ methyl ester as a white solid. This mixture is dissolved in 15 ml. of methanol, cooled to about 5°C. and stirred under nitrogen while 2 ml. of 50% aqueous potassium hydroxide is added. The mixture is then stirred, under nitrogen, for 4 hours at 25°C. The mixture is diluted with 100 ml. of water and extracted once with ethyl acetate. The aqueous phase is acidified with dilute hydrochloric acid and extracted 4 times with ethyl acetate. The ethyl acetate extracts are combined, washed 3 times with water and once with saturated aqueous sodium chloride, dried over sodium sulfate, and evaporated to give white crystalline material. This crystalline material is chromatographed over 150 g. of silica gel. The column is eluted with 500 ml. of 50% and 500 ml. of 75% ethyl acetate in cyclohexane, then with 4000 ml. of ethyl acetate followed by 500 ml. of 10% and 500 ml. of 25% methanol in ethyl acetate. The ethyl acetate-cyclohexane eluates

I

II

III

30 are discarded, then 50 ml. eluate fractions are taken beginning with the ethyl acetate eluate. Fractions 16 to 35 are evaporated and combined to give a residue which is recrystallized from a mixture of ethyl acetate and Skellysolve B to give dl 2-fluoro-19,19-dimethyl-PGF$_{1\alpha}$.

Fractions 46 to 84 are evaporated and combined to give a residue which is recrystallized from a mixture of ethyl acetate and Skellysolve B to give dl 2-fluoro-19,19-dimethyl-PGF$_{1\beta}$.

The above procedure is repeated but the mixture of dl 2-fluoro-19,19-dimethyl-PGF$_{1\alpha}$ methyl ester and dl 2-fluoro-19,19-dimethyl-PGF$_{1\beta}$ methyl ester is separated by chromatography on neutral silica gel, eluting with a gradient of 20–100% ethyl acetate in Skellysolve B, to give the separate alpha and beta isomers of these esters.

Following the procedure of Example 11, dl 15β-2-fluoro-19,19-dimethyl-PGE$_1$ methyl ester, dl 8β-2-fluoro-19,19-dimethyl-PGE$_1$ methyl ester, dl 8β,15β-2-fluoro-19,19-dimethyl-PGE$_1$ methyl ester, and both optically active forms of each of those are each transformed to the corresponding PGF$_{1\alpha}$-type and PGF$_{1\beta}$-type acids and esters.

Also following the procedure of Example 11, the ethyl, 2-ethylhexyl, phenyl, benzyl, and cyclohexyl esters of the 8α—15α, 8α—15β, 8β—15α, and 8β—15β forms of the racemic and both optically active forms of 2-fluoro-19,19-dimethyl-PGF$_{1\alpha}$ and 2-fluoro-19,19,dimethyl-PGF$_{1\beta}$ are obtained from the corresponding PGE$_1$-type compounds.

Also following the procedure of Example 11, the methyl, ethyl, 2-ethylhexyl, phenyl, benzyl, and cyclohexyl esters of the 8α—15α, 8α—15β, 8β—15α, and 8β—15β forms of the racemic and both optically active forms of 2-methyl-19-methyl-PGE$_1$, 2,2-dimethyl-20,20-dimethyl-PGE$_1$, 3,3-dimethyl-20,20-dimethyl-PGE$_1$, 2,2-dimethyl-19,19,20,20,20-pentafluoro-PGE$_1$, and 2-fluoro-19,19,20,20,20-pentafluoro-PGE$_1$ are each transformed to the corresponding PGF$_{1\alpha}$-type and PGF$_{1\beta}$-type acids and esters.

Also following the procedure of Example 11, each of the PGE$_1$-type esters described after Example 8 and each of the PGE$_1$-type acids described after Example 9 is reduced to the corresponding PGF$_{1\alpha}$-type and PGF$_{1\beta}$-type ester and acid.

I claim:

1. An optically active compound of the absolute configuration of natural PGE$_1$ or a racemic compound with the formula:

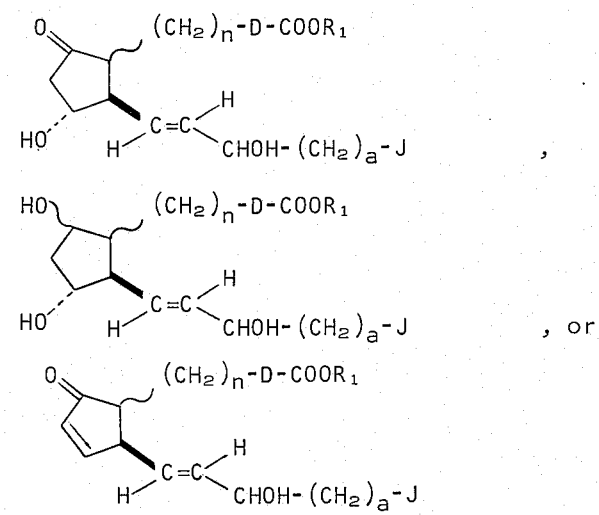

wherein $n$ is 1 to 6 and $a$ is zero to 4; wherein $R_1$ is hydrogen, alkyl of one to 8 carbon atoms, inclusive, cycloalkyl of 3 to 10 carbon atoms, inclusive, aralkyl of 7 to 12 carbon atoms, inclusive, phenyl, or phenyl substituted with one to 3 chloro or alkyl of one to 4 carbon atoms, inclusive; wherein J is isobutyl or tert-butyl; wherein D is ethylene substituted by one or 2 fluoro; and wherein ~ indicates attachment of the group to the ring in alpha or beta configuration, and pharmacologically acceptable salts thereof when $R_1$ is hydrogen.

2. A compound according to claim 1 wherein $R_1$ is hydrogen or alkyl of one to 4 carbon atoms, inclusive, and pharmacologically acceptable salts thereof when $R_1$ is hydrogen.

3. A compound according to claim 1 wherein the $-(CH_2)_n-D-COOR_1$ moiety is attached in alpha configuration.

4. A compound according to claim 3 wherein the side-chain hydroxy is in alpha configuration.

5. A compound according to claim 4 wherein $n$ is 4, and $a$ is 2 or 3.

6. A compound according to claim 5 wherein the formula is 1.

7. A compound according to claim 5 wherein the formula is 11 and the ring hydroxy is attached in alpha configuration.

8. A compound according to claim 5 wherein the formula is 11 and the ring hydroxy is attached in beta configuration.

9. A compound according to claim 5 wherein the formula is 11.

* * * * *

UNITED STATES PATENT AND TRADEMARK OFFICE
CERTIFICATE OF CORRECTION

PATENT NO. : 3,922,297
DATED : November 25, 1975
INVENTOR(S) : John E. Pike

It is certified that error appears in the above–identified patent and that said Letters Patent are hereby corrected as shown below:

Column 10, line 56: "and formula reactants $PGA_1$-type products." should read: --and formula X $PGA_1$-type products.--.
Column 13, lines 28-29: "-CH=$\lambda$CH-$(CH_2)_a$-Y." should read: -- -CH=CH-$(CH_2)_a$-Y.--.
Column 19, line 21: "solvent or either moderate" should read: --solvent of either moderate--.
Column 20, line 23: "bicyclo[3,1,0]hexane" should read: --bicyclo[3.1.0]hexane--.
Column 24, lines 7-8: "2,2-dimethyl-20,20-dimethyl-PGE methyl ester." should read: --2,2-dimethyl-20,20-dimethyl-$PGE_1$ methyl ester.--.
Column 24, lines 22-24: "6-endo-(7-methyl-1-octenyl)-3-oxo-bicyclo[3.1.0]hexane-2.6₂-(3,3-dimethylheptanoate)," should read: --6-endo-(7-methyl-1-octenyl)-3-oxobicyclo-[3.1.0]hexane-2β-(3,3-dimethylheptanoate),--.
Column 27, line 15: "19,19,20,20-pentafluoro," should read: --19,19,20,20,20-pentafluoro,--.
Column 28, lines 54-55: "and 8β-15β$\lambda$ forms" should read: --and 8β-15β-forms--.

UNITED STATES PATENT AND TRADEMARK OFFICE
CERTIFICATE OF CORRECTION

PATENT NO. : 3,922,297
DATED : November 25, 1975
INVENTOR(S) : John E. Pike

It is certified that error appears in the above-identified patent and that said Letters Patent are hereby corrected as shown below:

Column 28, line 64: "2,2-dimethyl-19,19,20,20,20-pentafluoro-PGA," should read: --2,2,-dimethyl-19,19,20,20,20-pentafluoro-$PGA_1$,--.
Column 31, Claim 3: "according to claim 1" should read: --according to claim 2--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*